United States Patent
Knyrim et al.

(10) Patent No.: US 7,000,630 B2
(45) Date of Patent: Feb. 21, 2006

(54) FLAME FRONT DIVERTER ELEMENT

(75) Inventors: Robert C. Knyrim, Hilton, NY (US); Timothy F. Simmons, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 140 days.

(21) Appl. No.: 10/718,899

(22) Filed: Nov. 21, 2003

(65) Prior Publication Data

US 2005/0109397 A1    May 26, 2005

(51) Int. Cl.
*F16K 17/40* (2006.01)
*F24F 11/00* (2006.01)

(52) U.S. Cl. .............................. 137/68.23; 137/68.25; 137/467; 169/48; 454/194

(58) Field of Classification Search .. 137/68.19–68.26; 169/48; 48/192; 454/194; 431/346
See application file for complete search history.

(56) References Cited

U.S. PATENT DOCUMENTS

| | | | | |
|---|---|---|---|---|
| 3,871,458 A | * | 3/1975 | Dumazet | 169/45 |
| 4,118,173 A | * | 10/1978 | Shakiba | 431/202 |
| 4,342,251 A | | 8/1982 | Wahlfeldt et al. | |
| 4,949,748 A | | 8/1990 | Chatrathi et al. | |
| 5,018,585 A | * | 5/1991 | Brennecke et al. | 169/48 |
| 5,400,525 A | | 3/1995 | Sheley | |
| 5,461,831 A | * | 10/1995 | Michal | 52/1 |
| 6,540,029 B1 | * | 4/2003 | Snoeys et al. | 169/46 |

* cited by examiner

*Primary Examiner*—Ramesh Krishnamurthy
(74) *Attorney, Agent, or Firm*—Clyde E. Bailey

(57) ABSTRACT

A flame front diverter element is designed to cause a minimal pressure drop under normal venting conditions when process vapors need to pass through the explosion protection system and to other equipment connected to the manifold system. In the event of a deflagration, the flame front diverter directs the high-speed pressure wave towards a bi-directional rupturable disc causing the rupturable disc to open thus creating an aspiration effect on the opposite bi-directional rupturable disc.

8 Claims, 4 Drawing Sheets

FLAME FRONT DIVERTER ELEMENT

CROSS REFERENCE TO RELATED APPLICATIONS

The present application is related to U.S. application Ser. No. 10/719,436, filed Nov. 21, 2003, now U.S. Pat. No. 6,908,377 of Robert C. Knyrim and Timothy F. Simmons, and entitled, "An Explosion Protection Venting System".

FIELD OF THE INVENTION

The invention relates generally to the field of explosion protection systems. More specifically, the invention relates to a flame front diverter element when used in an explosion protection venting system having a plurality of vessels diverts a deflagration in a different direction than the normal flow path thereby virtually eliminating any impending disastrous effects to surrounding structure.

BACKGROUND OF THE INVENTION

According to maximum achievable control technology (MACT) and European regulations, emerging emission standards will affect most manufacturing areas containing operational vents to atmosphere. A cost-effective strategy for treating hazardous flammable solvent emissions is to manifold operational vessel vents together to one emission control device. However, in the unexpected event of a flammable solvent ignition, there is a possibility of fire or deflagration propagation, which could potentially destroy any or all the devices connected in the vent system. Therefore, fire and explosion protection schemes must be in place to minimize potential consequences of a fire or explosion. Prior art includes an explosion diverter or backflash interrupter to prevent flames from propagating from one piece of equipment to another through the interconnecting piping.

The basic principle of operation of a typical device as described above is that a deflagration is vented in a different flow direction than the normal flow path. Due to the inertia of the fast flow caused by the deflagration, the flow will tend to maintain its direction upward rather than making the hard degree turn as when the vessel emission flow velocity is low during normal conditions. When the high-speed deflagration flame continues upward, it pushes open either a hinged cover or bursts a rupture disc located at the top of the diverter, allowing the flame to be released to the atmosphere. The limitations placed on the existing device are that it can only be used in processes with a combustible dust with very low concentrations. The operating pressure is limited to 0.1 barg (1.5 psig) due to the pressure setting of the relief device required for approval.

Another device to prevent propagation during a deflagration is the explosion isolation valve. There are high-speed sensors installed on both sides of the isolation valve to detect a high rate of pressure rise in the pipeline and then close the valve before the deflagration can pass through. This is an expensive scheme with no guarantee that the valve will close before the deflagration or flame passes through.

Therefore, a need persists in the art for an explosion protection venting system having a flame front diverter element that diverts deflagration along an alternate path and away from the normal flow path that avoids a disastrous impact to nearby structures.

SUMMARY OF THE INVENTION

The present invention is directed to overcoming one or more of the problems set forth above. Briefly summarized, according to one aspect of the present invention, an explosion protection venting system has a plurality of vessels. Each one of the plurality of vessels has a vent in fluid communications with a common connection line between the plurality of vessels. A flame front diverter is connected to each one of the plurality of vessels. The flame front diverter has an elongated channel that has opposing first and second end portions and a rupturable disc in fluid communications with the elongated channel mounted to each of the opposing first and second end portions. First and second vapor flow channels are disposed in the elongated channel. Either of the first and second vapor flow channels is connected to the common connection line to receive process vapor and to form a primary flow path for process vapor propagation between the elongated channel and the other of the first and second vapor flow channels to a downstream process. In this manner, effluent produced by excessive pressure caused by combustion of the process vapor is diverted away from the primary flow path and through one of the rupturable disc that ruptures outwardly from the elongated channel. Further, the other of the rupturable disc ruptures inwardly of the elongated channel causing an instantaneous stream of outside air to flow inwardly of the elongated channel between each of the rupturable discs thereby interrupting the combustion process.

The present invention has the following advantages over prior art developments, including: it is a relatively passive system; it will work up to about 5 psig operating pressure; it will operate at a vapor through put rate up to about 350 fit/min; and, it will mitigate any deflagration independent of the starting point in any pipeline connected to the venting system.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
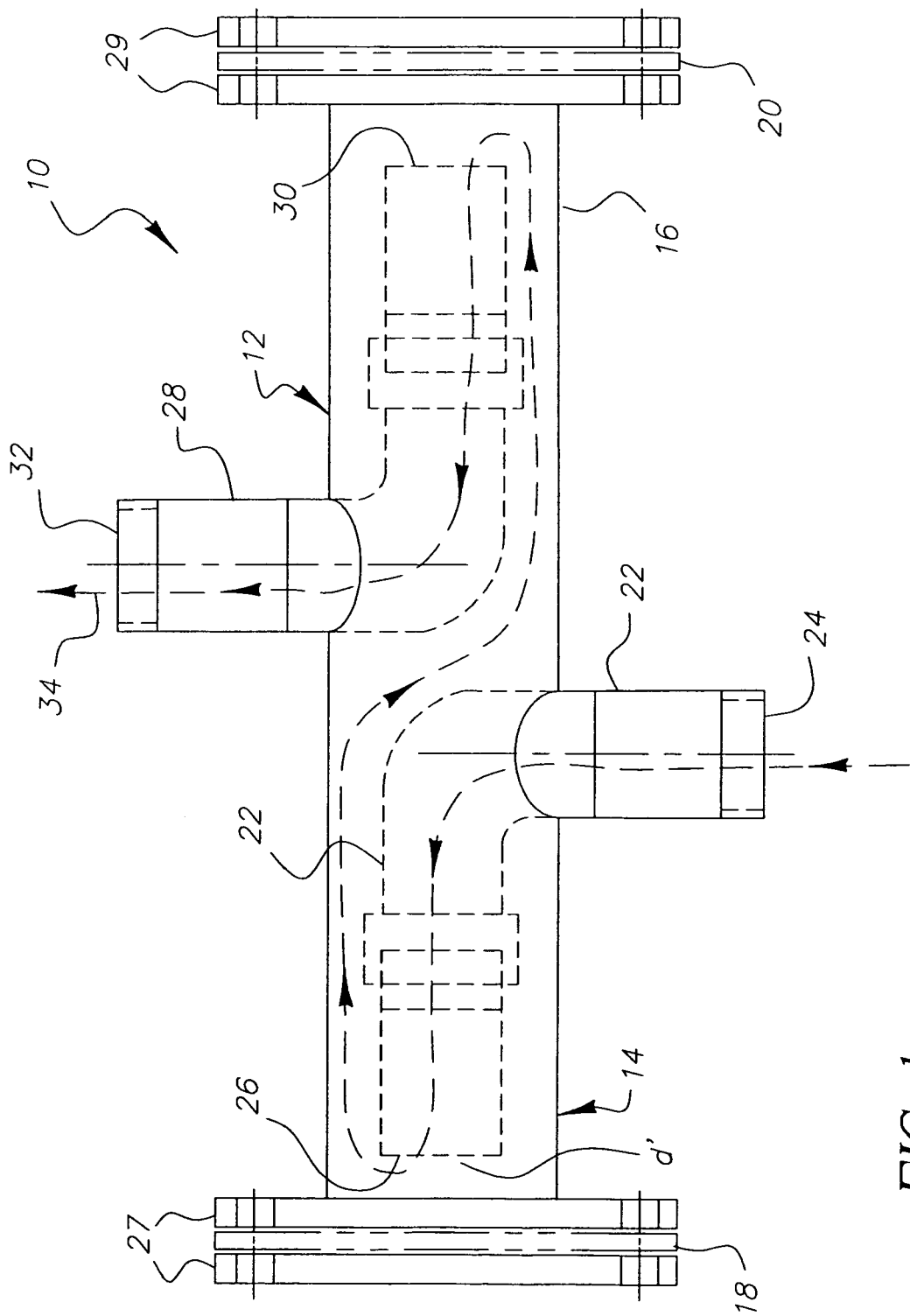
FIG. 1 is a side view of the flame diverter element of the invention.
Figure 2:
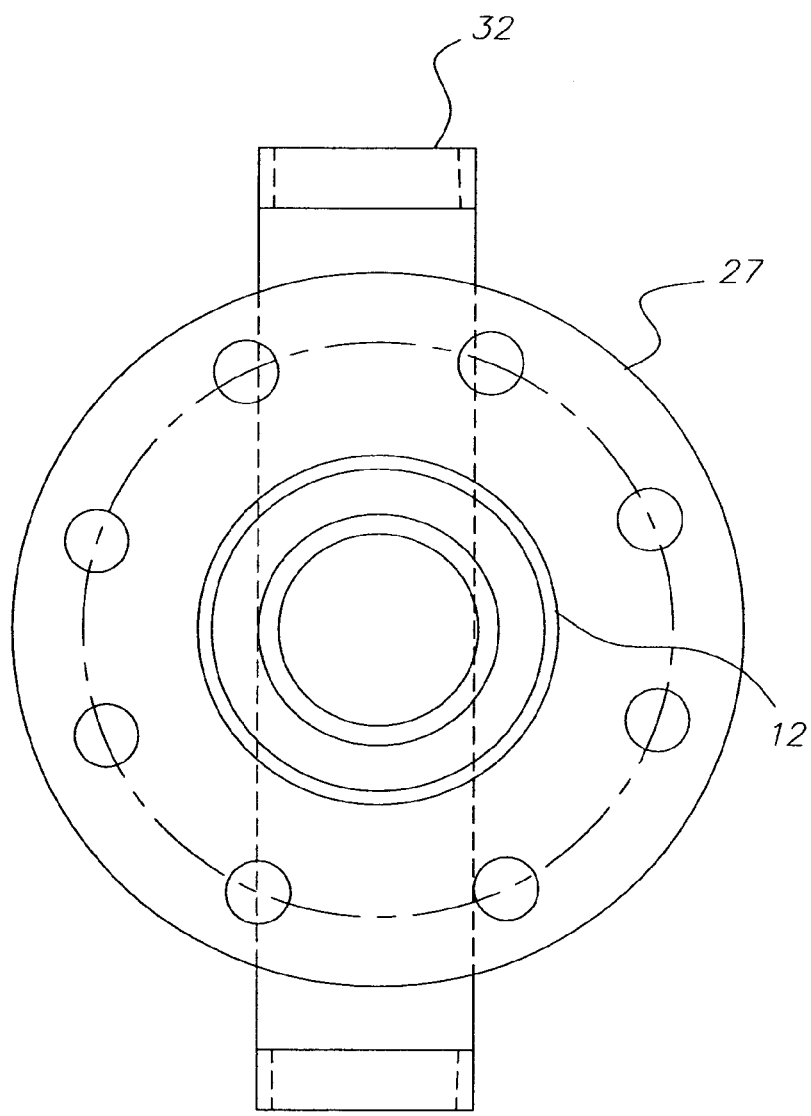
FIG. 2 is an end view of the rupturable disc used in accordance with the invention.
Figure 3:
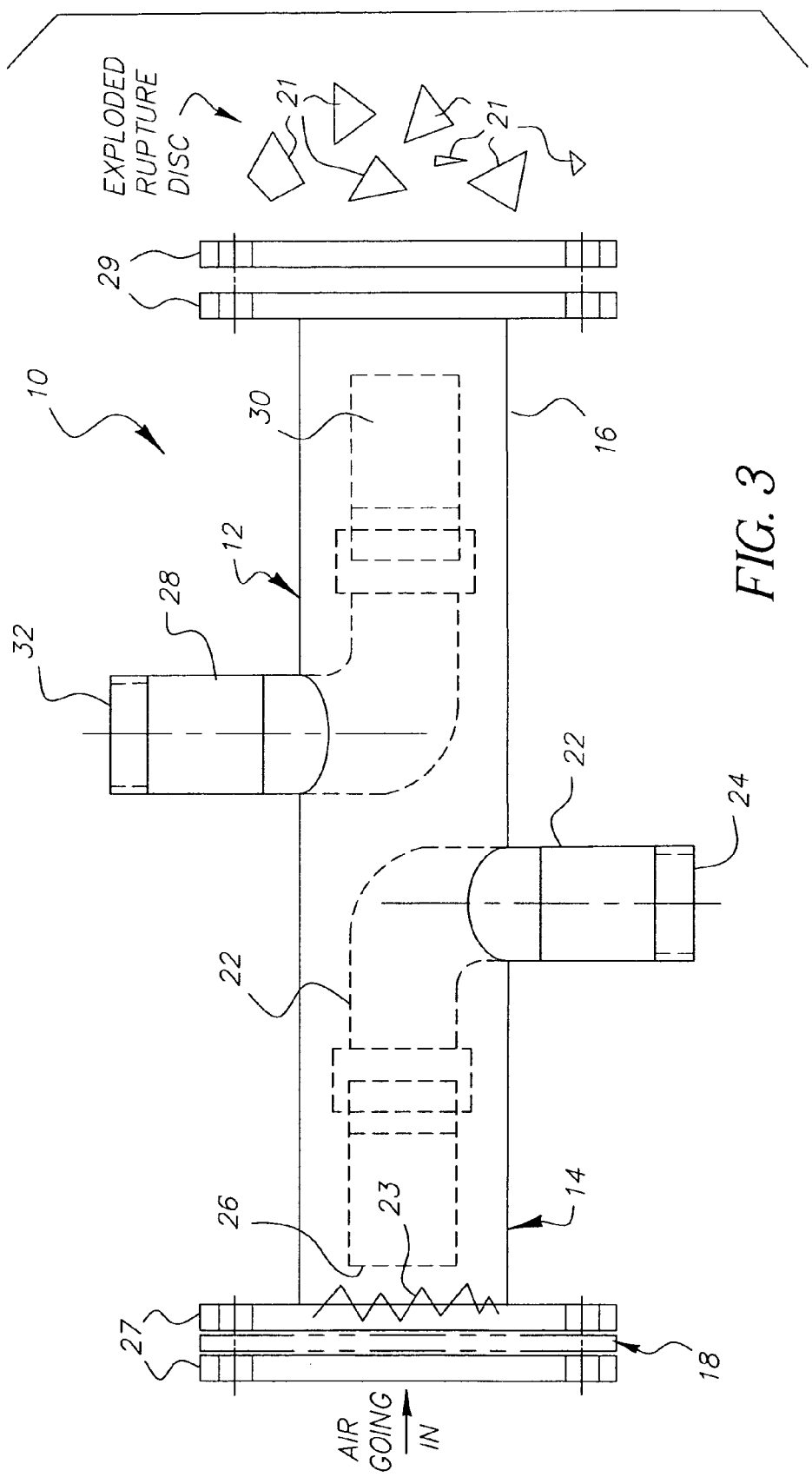
FIG. 3 is an perspective view of the flame front diverter partially exploded to show the rupturable discs displaced during a deflagration; and, FIG. 4 is a schematic of an explosion protection venting system of the invention.

Turning now to the drawings, and in particular to FIGS. 1 and 3, the flame front diverter element 10 of the invention is illustrated. According to FIG. 1, flame front diverter element 10 has an elongated channel 12 having opposing first and second end portions 14, 16. A rupturable disc 18, 20 is arranged in fluid communications with the elongated channel 12. Either one of rupturable disc 18, 20 is mounted to one of the opposing first and second end portions 14, 16 of elongated channel 12.

According to FIG. 1, a first vapor flow channel 22 disposed in an end portion of elongated channel 12 has an inlet end 24 and outlet end 26. Similarly, a second vapor flow channels 28 disposed in an opposing end portion of elongated channel 12 has an inlet end 30 and an outlet end 32. Preferably first and second vapor flow channels 22, 28 are welded to elongated channel although other attachment means, such as bolting, may work with similar success. It is important to the invention that the inlet end 30 has a predetermined spacing (d) from the nearest rupturable disc 20. Each rupturable discs 18, 20 is sandwiched between a pair of opposing flanges 27, 29, respectively, fixedly mounted to the elongated channel 12.

Referring again to FIG. 1, flanges 27, 29 each has a diameter of about 4 inches and a force rating of 150 lbs to withstand the deflagration pressure. It is our experience that the inlet end 30 of vapor flow channel 28 is preferably spaced apart ⅝ inch to 1½ inches from rupturable disc 20 at setup. Outside the lower spacing limit, i.e., ⅝ inch, the flame diverter element 10 has been observed to plug-up. Beyond the upper spacing limit, i.e., 1½ inch, the opposing rupturable disc 18 may not rupture. Similarly, it is important that the outlet end 26 of vapor flow channel 22 has a predetermined spacing (d') from nearest rupturable disc 18 at the other end of the elongated channel 12. According to our testing outlet end 26 is preferably spaced apart ⅝ inch to 1½ inch from rupturable disc 18 at setup. Outside the lower spacing limit, i.e., ⅝ inch, the flame diverter element 10 has been observed to plug-up. Beyond the upper spacing limit, i.e., 1½ inch, the opposing rupturable disc 20 may not rupture. Moreover, either of the first and second vapor flow channels 22, 28 is configured to receive process vapor from a flammable process and to form a primary flow path 34 for process vapor propagation between the elongated channel 12 and the other of the first and second vapor flow channels 22, 28 to a downstream process.

It is preferred that elongated channel 12 has a wall thickness of at least 0.237 inches and the vapor flow channels 22, 28 has a wall thickness of at least 0.139 inches to withstand peak deflagration pressure.

Figure 4:
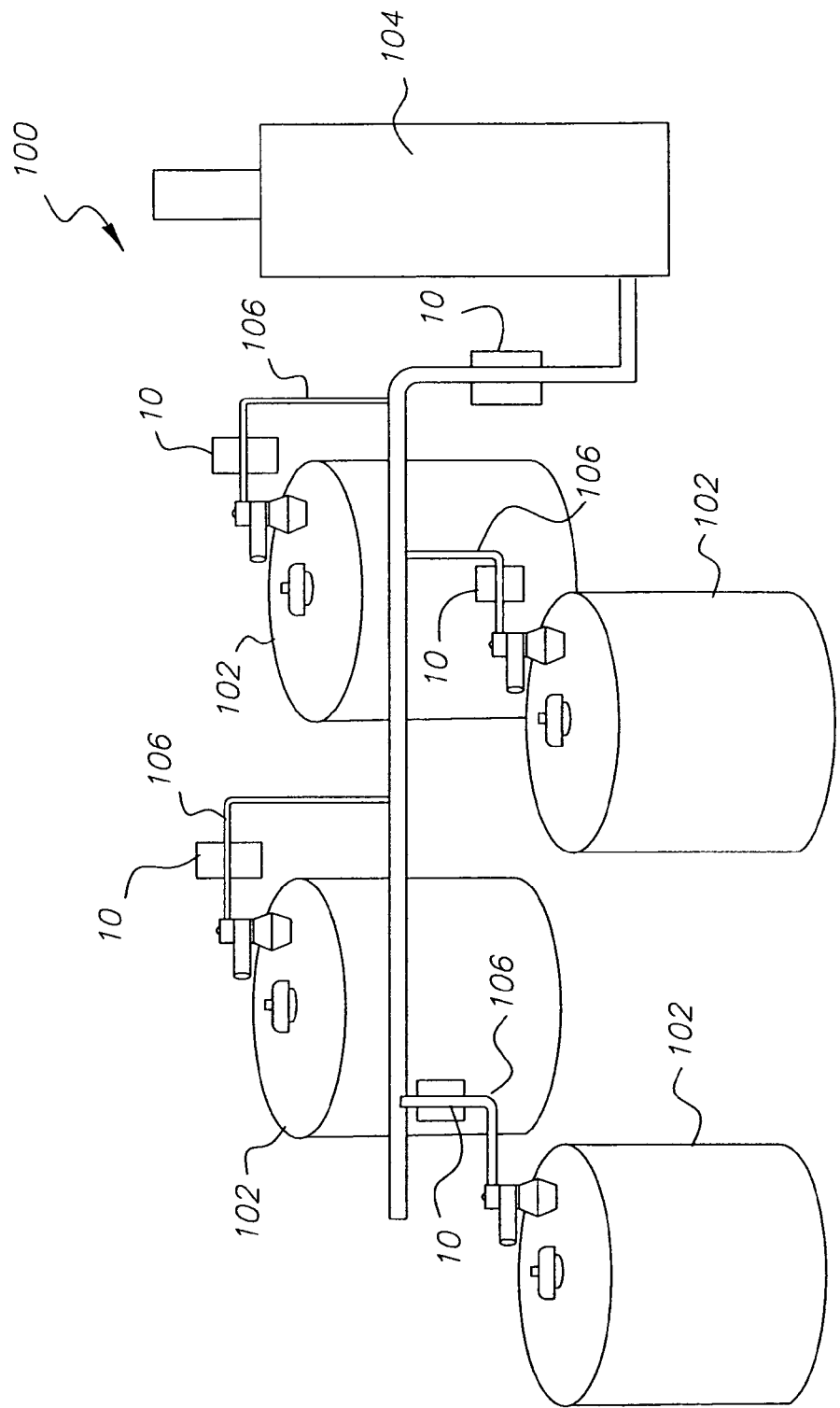

Further, rupturable discs 18, 20 are each bi-directional relative to the elongated channel 12 so that a deflagration can be vented in either direction relative to the interconnected vessel or reactor (see FIG. 4). Also, rupturable discs 18, 20 are capable of rupturing at a pressure of not more than about 5 psig. The dual bi-directional rupturable discs 18, 20 are to account for the possibility that a deflagration can start on either side of the flame front diverter element 10.

Referring to FIG. 3, once the deflagration starts, one rupturable disc 18, 20 will burst outwards from the pressure ahead of the flame front diverter element 10 at 0.34 barg (5 psig) potentially producing fragments 21. The high deflagration flow rate creates an aspiration effect on the opposite rupturable disc 18, 20 causing it to burst inwards forming potentially jagged edges 23 or fragmented pieces of the disc inside elongated channel 12. This allows a rush of ambient air into the elongated channel 12 to obstruct the continual flow of hot gases downstream of the flame front diverter 10.

Referring to FIG. 4, according to another embodiment of the invention, flame front diverter element 10 is specifically designed for installation in an explosion protection system 100 from a plurality of vessels 102 (for instance reactors) manifold together to a final emission control element 104. In this embodiment, flame front diverter element 10 (described above) is connected to each of the vent lines 106 associated with each vessel 102 and final emission control element 104. If a vessel 102 has an internal deflagration, other vessels 102 connected in the vent line 106 could become involved with the initial deflagration. Skilled artisans will appreciate that flame front diverter element 10 is designed to prevent a deflagration from propagating from one vessel 102 to another vessel 102 or to the final emission control element 104. The operating conditions of the explosion protection system 100 can be higher than prior art design flow rates, any flammable solvent concentration, and up to operating pressure of 0.34 barg (5 psig).

Referring again to FIG. 4, flame front diverter element 10 is designed to cause a minimal pressure drop under normal venting conditions when process vapors need to pass through the explosion protection system 100 and to other equipment connected to the manifold system. In the event of a deflagration, the flame front diverter 10 directs the high-speed pressure wave towards a bi-directional rupturable disc 18, 20 causing the rupturable disc 18, 20 to open thus creating an aspiration effect on the opposite bi-directional rupturable disc 18, 20. Fresh air immediately is caused to enter the elongated channel 12 to interrupt the continuous hot gas flow, thus stopping the downstream deflagration propagation. As shown in FIG. 4, flame diverter element 10 can be installed in the manifold system between each vessel 102/process equipment and upstream of an emission control element 104 in the atmospheric vent line 106 containing flammable vapors.

The invention has been described with reference to a preferred embodiment. However, it will be appreciated that a person of ordinary skill in the art can effect variations and modifications without departing from the scope of the invention.

PARTS LIST 10 flame front diverter element
12 elongated channel
14 end portion
16 end portion
18 rupturable disc
20 rupturable disc
21 fragments of exploded disc
22 first vapor flow channel
23 jagged edge of exploded disc
24 inlet end
26 outlet end
27 flange
28 second vapor flow channel
29 flange
30 inlet end
32 outlet end
34 flow path
100 explosion protection system
102 vessel
104 final emission control element
106 vent line

What is claimed is:

1. Flame diverter element, comprising:
an elongated channel having opposing first and second end portions and a rupturable disc in fluid communications with said elongated channel mounted to each of said opposing first and second end portions; and,
first and second vapor flow channels disposed in said elongated channel, said first and second vapor flow channels each having an inlet and outlet, one of said inlet having a predetermined spacing from said rupturable disc at one of said opposing first and second end portions and one of said outlet having a predetermined spacing from the other end of said elongated channel, either of said first and second vapor flow channels being configured to receive process vapor from a flammable process and to form a primary flow path for process vapor propagation between said elongated channel and the other of said first and second vapor flow channels to a downstream process.

2. The flame diverter element recited in claim 1 wherein said rupturable discs are each bi-directional relative to said elongated channel.

3. The flame diverter element recited in claim 1 wherein each one of said rupturable discs is capable of rupturing at a pressure of not more than about 5 psig.

4. The flame diverter element recited in claim 1 wherein said elongated channel has a wall thickness of at least 0.237 inches and said vapor flow channel has a wall thickness of at least 0.139 inches.

5. The flame diverter element recited in claim 1 wherein said vapor flow channels are welded to said elongated channel.

6. The flame diverter element recited in claim 4 wherein said elongated channel has a diameter of about 4 inches and said vapor flow channels each has a diameter of about 2 inches.

7. The flame diverter element recited in claim 1 wherein each of said rupturable discs is sandwiched between a pair of opposing flanges fixedly mounted to said elongated channel.

8. The flame diverter element recited in claim 7 wherein said pair of opposing flanges has a diameter of about 4 inches and a force rating of 150 lbs.

* * * * *